Jan. 19, 1926. 1,570,093
W. SNODGRASS
SUGAR CANE HARVESTER
Filed Sept. 23, 1922 5 Sheets-Sheet 3
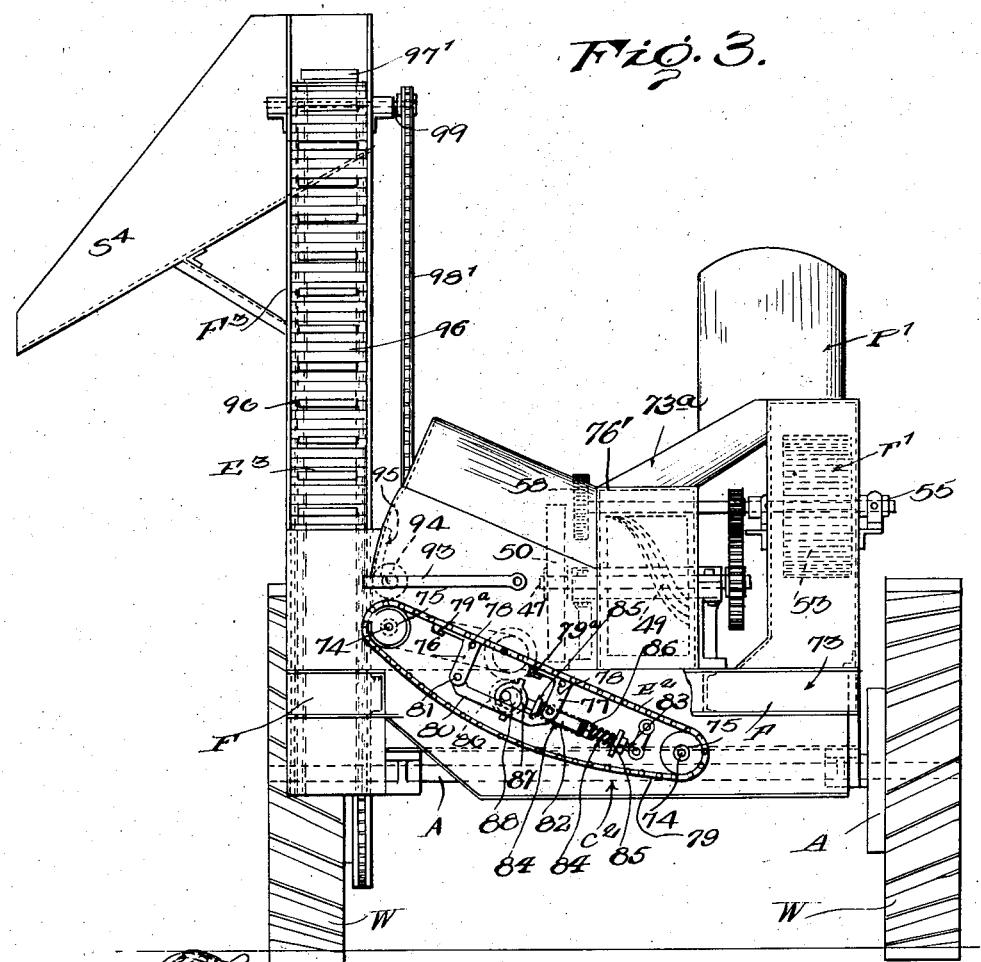
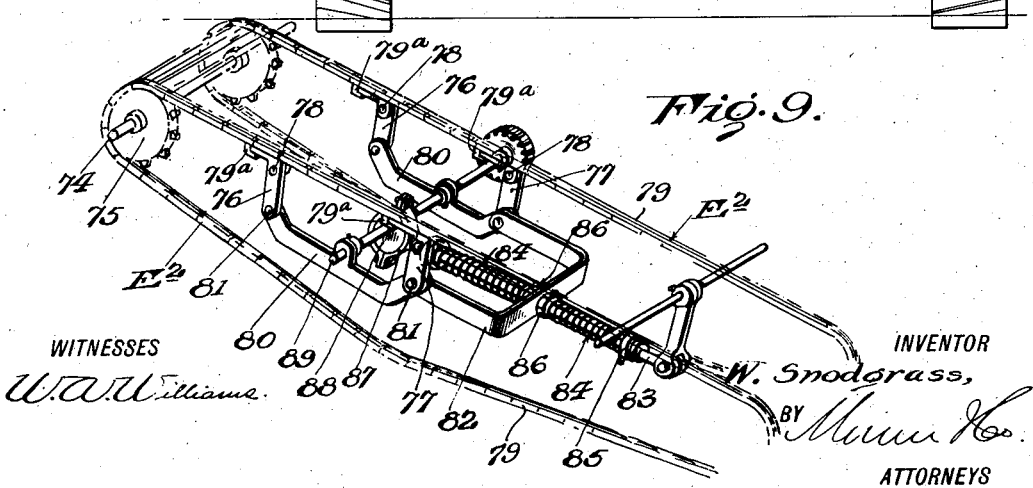

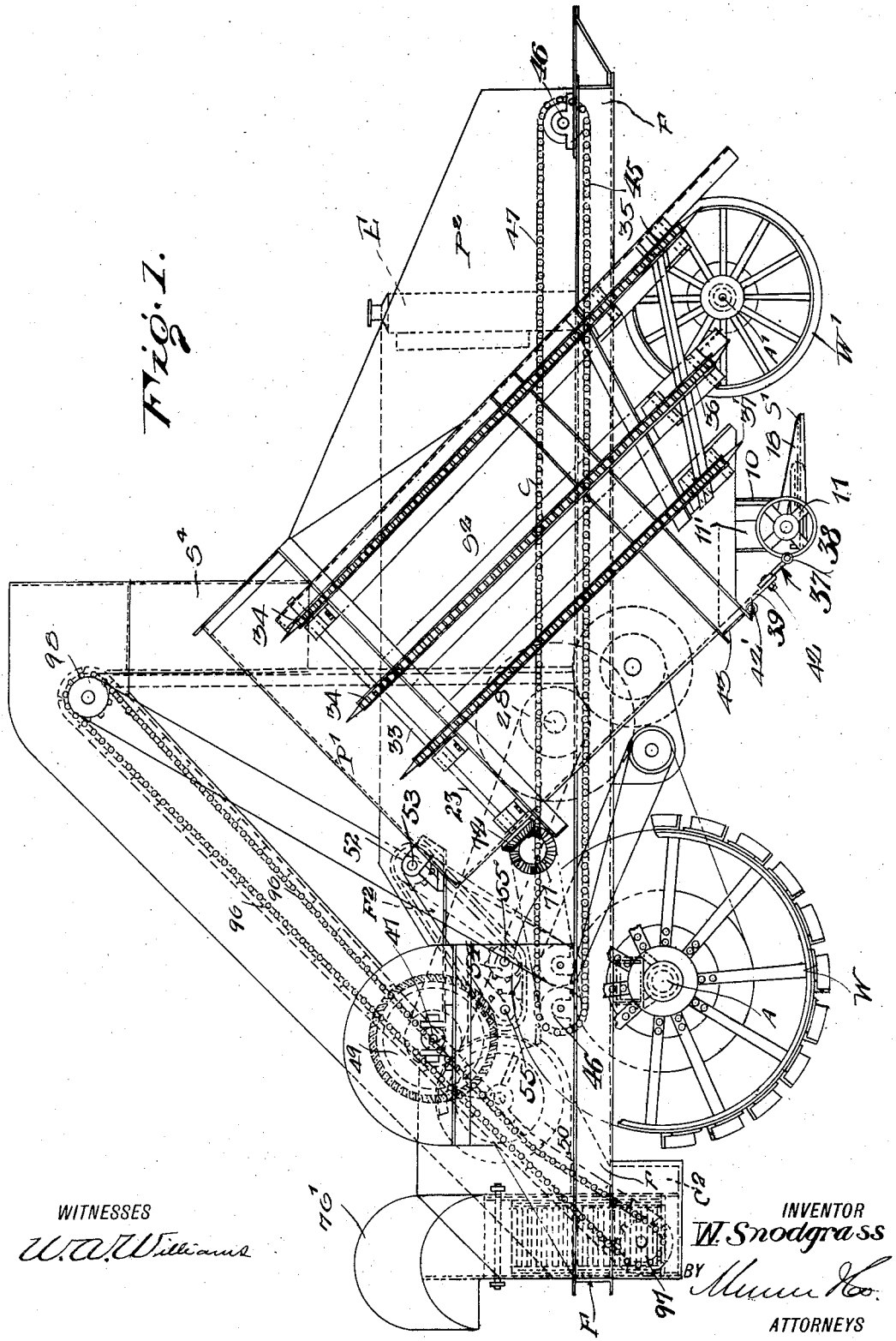

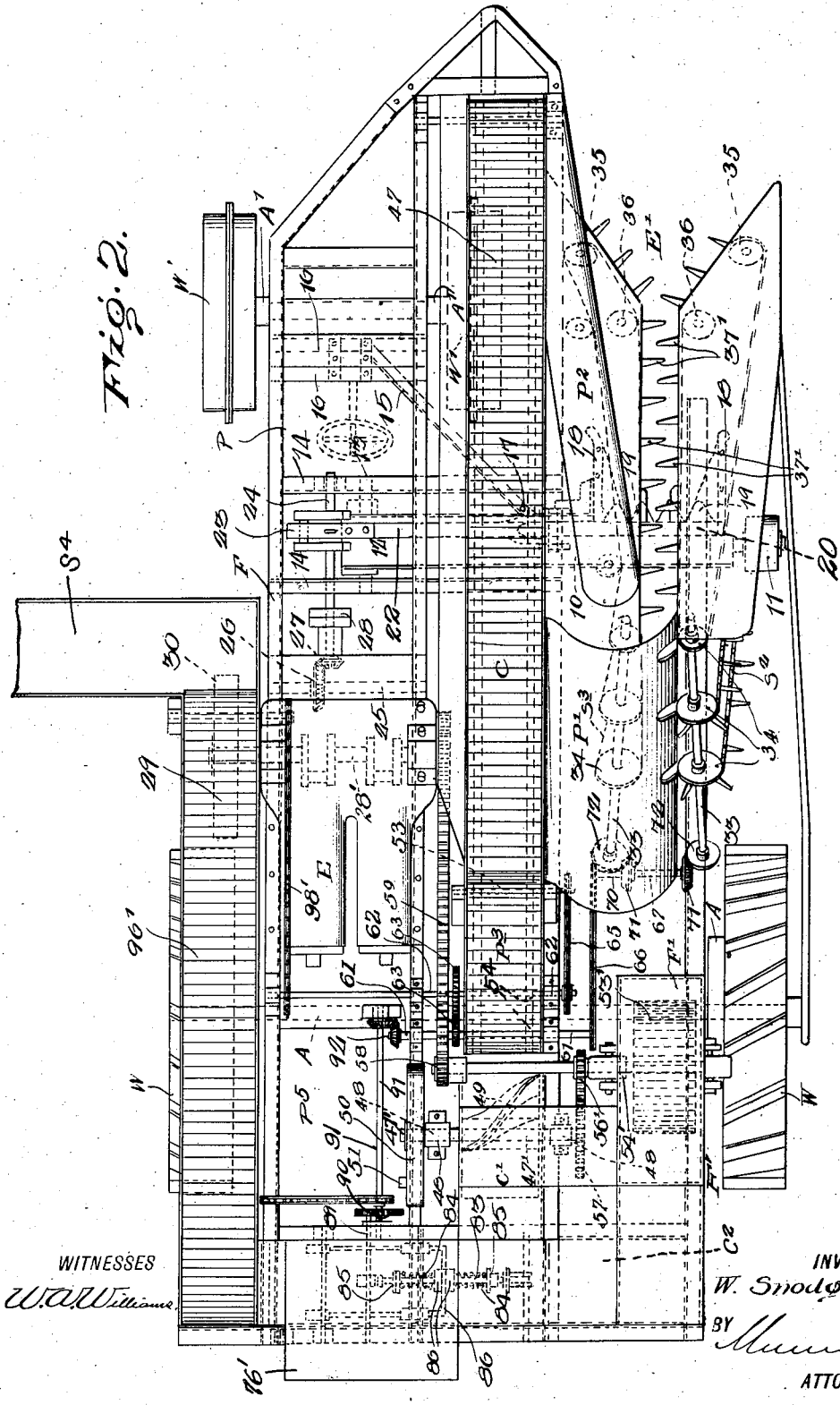

Jan. 19, 1926. 1,570,093
W. SNODGRASS
SUGAR CANE HARVESTER
Filed Sept. 23, 1922 5 Sheets-Sheet 4
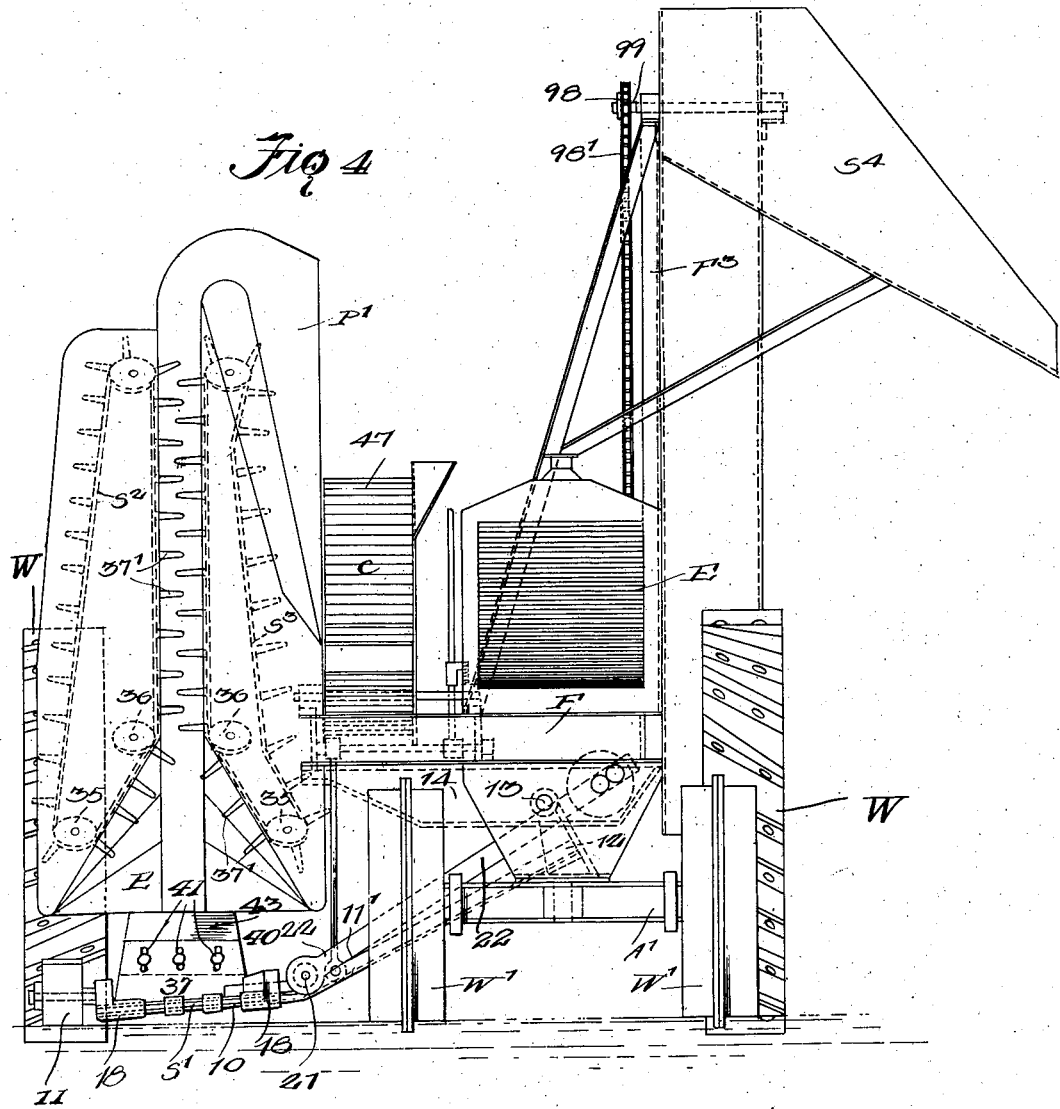
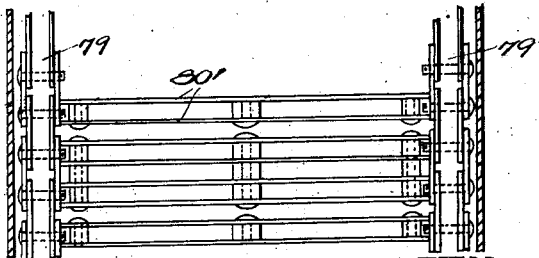
WITNESSES
INVENTOR
William Snodgrass.
BY
ATTORNEYS

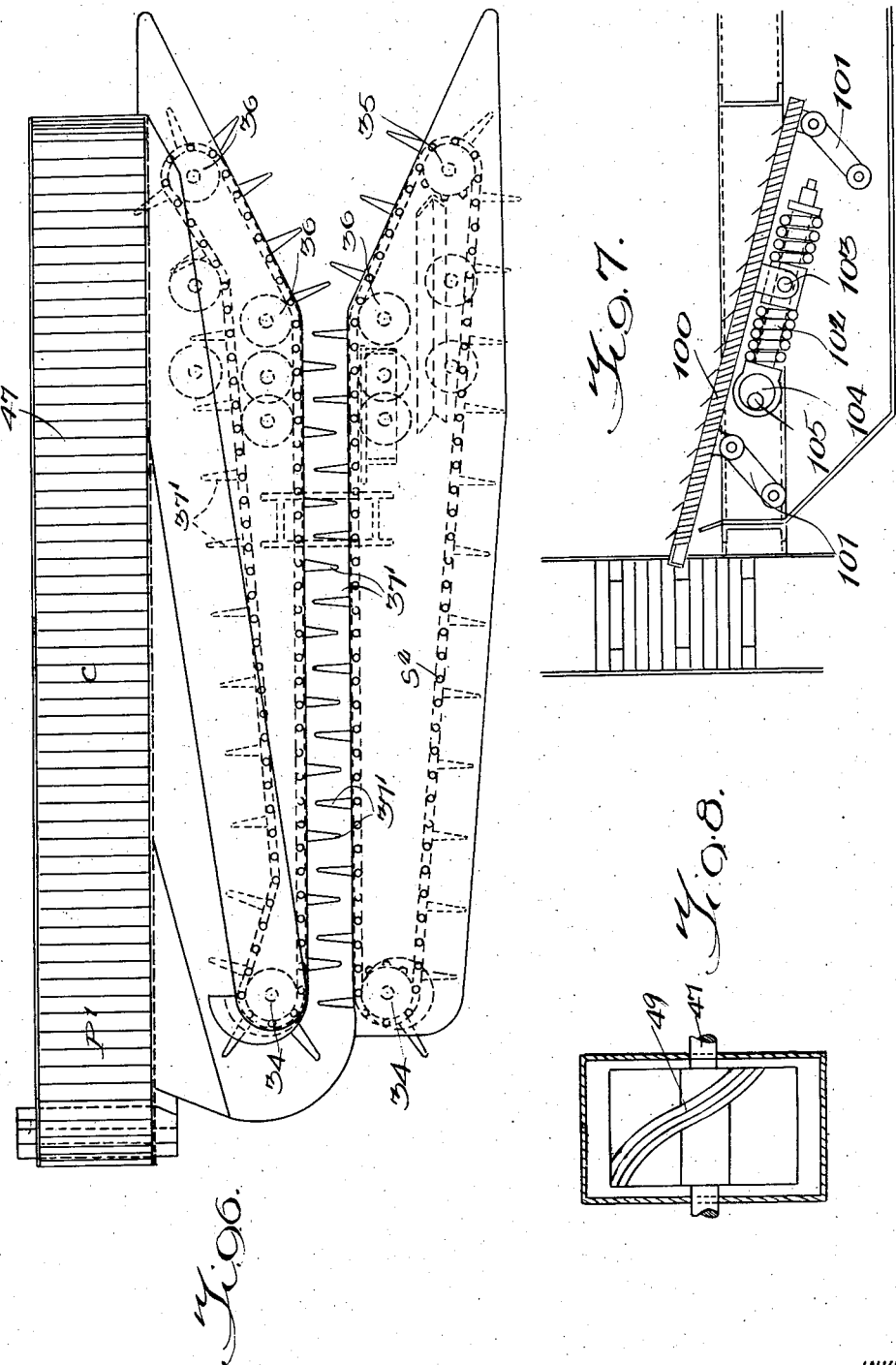

Patented Jan. 19, 1926.

1,570,093

UNITED STATES PATENT OFFICE.

WILLIAM SNODGRASS, OF SENADO, CUBA.

SUGAR-CANE HARVESTER.

Application filed September 23, 1922. Serial No. 590,140.

*To all whom it may concern:*

Be it known that I, WILLIAM SNODGRASS, a citizen of the United States, and a resident of Senado, in the Province of Camaguey, Cuba, have invented certain new and useful Improvements in Sugar-Cane Harvesters, of which the following is a specification.

This invention relates to improvements in sugar cane harvesters.

In harvesting cane, the cane stalks are usually cut into sections and then loaded on wagons and transported to the sugar manufacturing plant. If the cane is harvested annually a great deal of labor is required to cut even a small acreage and thus entails a great deal of expense.

With the above in view it is the object of this invention to provide a sugar cane harvester by which cane stalks may be severed in an efficient and expeditious manner and then cut into proper lengths for the grinding machine of the sugar plant to which the cane is ultimately delivered.

It is also an important object of the invention that means be provided whereby not only the stalks will be severed into short sections but that also the tops and leaves will likewise be cut into short sections.

It is a further and important object of the invention that the tops and leaves of the cane severed may be separated in as thorough a manner as possible from the cane stalks.

Other objects, and objects relating to details of construction will hereinafter appear.

In carrying out the invention, it is contemplated to employ a suitable running gear and power means for driving the same, said power means and running gear constituting a tractor of conventional form, and mounted upon this is the apparatus for obtaining the necessary objects of the invention. A suitable cutter bar is employed and means associated therewith whereby the cane stalks may be delivered from said cutter bar after being severed into a conveyor and from this conveyor the cane stalks are delivered to the cutter unit. After the cane stalks together with the leaves and tops have been chopped into short sections by means of the cutter unit, the same is passed to a cleaning means whereby the tops and leaves are separated from the cane stalk sections and cast upon the ground from which the cane is taken. The cane stalk sections or pieces are then delivered to a chute from which they may be taken and transported to a sugar cane factory.

The invention is illustrated by way of example in the accompanying drawings, in which:—

Figure 1 is a view in side elevation of the cane harvester machine.

Figure 2 is a top plan view of the same.

Figure 3 is a rear elevation of the machine.

Figure 4 is a front elevation of the machine.

Figure 5 is a detailed view of a conveyor belt.

Figure 6 is a fragmentary plan view of cane stalk elevator and conveyor associated therewith.

Figure 7 is a detailed view of an alternative agitator unit.

Figure 8 is a detail view of cutter unit.

Figure 9 is a detail perspective of a combined agitator and elevator unit employed in the present machine.

Many of the minor details such as operating levers, guards, covers, oiling devices, clutches, etc., are not shown in the drawings in order not to obscure the more important items of the invention. The kind of chains, sprockets, bearings, oil cups, etc., are to be suited to the particular needs.

Referring to the drawings more particularly, W indicates generally the rear wheels of the running gear and W' the front wheels thereof, said rear wheels being journaled upon the rear axle as at A, and the front wheels journaled upon the front axle A'. The front and rear wheels W and W' positioned upon the left hand side are substantially in alignment, while on the other side of the machine the rear wheel W is positioned a considerable distance outward with relation to the front wheel W'. The rear and front wheels support a frame generally indicated by the reference character F, and upon this frame there is suitably supported an engine E for propelling the machine. A platform P is located adjacent the forward end of the frame carrying a steering wheel S for guiding or steering the machine through the front wheels W'. The frame F may be constructed in any desirable manner with the purpose of making the same rigid and durable.

Upon the right hand side of the machine and adjacent its forward end is positioned the guard bar generally indicated by the reference character S¹, said guard bar consisting of a channel bar 10 which is supported at its outer end by a wheel 11, said wheel being preferably vertically adjustable, and said guard bar having formed at its inner end an upwardly extending portion 11′ which is secured at its free end to a casting 12, said casting being pivoted as at 13 to a cross member 14 of the frame F. A brace 15 is pivotally connected to the cross member 16 of the frame F at its front end and at its other end to the guard bar S¹ as at 17. As is obvious by this arrangement the guard bar S¹ may be swung upwardly about its pivot 13, the brace 15 permitting this movement. The guard bar is provided with guards or fingers 18. A suitable cutter bar 20 and blades 19 may be carried by the guard bar. The cutter bar may be pivotally connected at its inner end as at 21 to the pitman 22, said pitman at its other end being pivotally connected as at 23 to a crank shaft 24. The pivotal connection at the inner end of the pitman rod or bar 22 is in substantial alignment with the pivotal connection 13 of the casting 12. The crank shaft 24 is driven from a shaft 25 through the bevelled gear 26 and a pinion 27. Also a clutch 28 is preferably interposed in the crank shaft 24. The shaft 25 is driven from the crank shaft 28′ of the engine E. The gears 29 and 30 establish a connection between the crank shaft 28′ and the shaft 25.

Associated with the guard bar S¹ is an elevator generally referred to by the reference character E¹ adapted to elevate the stalks of cane severed by said cutter bar upon a conveyer C. The elevator E¹ comprises two sets of sprocket chains S² and S³. The sets of sprocket chains S² and S³ move in an inclined plane and parallel to each other. A shaft 33 is provided for each set of sprocket chains S² and S³, said shafts being positioned at the rear of the guard bar S¹ and inclined forward. Each shaft carries a plurality of sprocket wheels 34, said sprocket wheels decreasing in diameter toward the upper end of the shaft. The sprocket chains of the set S² pass over the sprocket wheels 34 of the outermost shaft 33, while the sprocket chains of the set S³ pass over the sprocket wheels 34 of the innermost shaft 33. Each sprocket chain of the two sets passes over a pair of sprocket wheels 35 and 36 located at the forward end of the elevator unit E¹. The sprocket wheels 35 and 36 are journaled in any preferable manner, and as seen in the drawings, the sprocket wheels 35 in each instance are a greater distance apart than the sprocket wheels 36 and thus provide a V-shaped opening at the forward end of the elevator E¹ into which the row of cane being operated upon may pass. Each chain of the sets S² and S³ is provided with or carries a plurality of teeth 37′. The teeth are so spaced and arranged that with the movement of these different sprocket chains the teeth of one set of sprocket chains will be disposed within the teeth of the other as illustrated to advantage in Figure 2 of the drawings. The teeth engage with the stalks of cane being severed and carry the same upward.

At the rear of the guard bar S¹ there is positioned a plate 37, which is hinged at its lower end to the channel bar 10 as at 38. A second plate 39 is provided and is hinged as at 42′ to a frame member 43. The plate 39 overlaps plate 37 and the overlapping portions of these plates are provided with slots 41 (Figure 4) through which bolts 42 are extended for connecting said plates together. By this connection the lower plate 37 is free to move upward with respect to plate 39. The lower end of plate 37 is so disposed that it will engage the severed ends of cane stalks and urge said stalks upwardly with the forward movement of the machine.

At a point above the shaft 33 of the set of sprocket chains S³ there is positioned or mounted a guide plate P¹, said guide plate being substantially semi-circular in cross section and extending forwardly the distance shown. Forward of the guide plate P¹ there is positioned a curved sheeting plate P² which is inclined as shown and the rear end of which is in spaced relation with the forward end of the plate P¹. The plate of sheeting P² is adapted to receive the cane stalks delivered from the elevator E¹ and deposit the same upon the conveyer C.

The conveyer c may consist of a pair of sprocket chains 45 trained about suitable sprocket wheels 46 suitably positioned upon the frame of machine. Suitable slats 47 are extended between these sprocket chains and secured thereto in any conventional manner.

At the rear of the conveyor C there is located the cutter unit generally indicated by the reference character C¹, said cutter unit comprising a shaft 47′ supported by suitable bearings 48 and carrying a single blade 49, said blade being preferably made of steel and being helical in shape as shown. One end of the shaft 47′ carries a fly-wheel 50 which is provided with a weight 51 to balance the cutter blade 49.

Previous to the moment that the cane stalks are delivered to the cutter C¹, the same are engaged by a presser unit P³ which consists of a pair of sprocket chains carrying slats therebetween the same as conveyor C, each sprocket chain passing over forward sprocket wheels 52 supported by a shaft 53 and over the two sprocket wheels 54 which are arranged, as shown in Figure 1, and which are supported by the two short shafts 55 and 55'. Shafts 55 and 55' are supported on a framework $F^2$ which is pivoted on shaft 53.

At the one side of the cutter unit $C^1$ and slightly forward thereof there is provided a fan $F^1$ which may consist in the ordinary radial blades 53' carried by a suitable shaft 54' which is properly journaled as shown. The shaft 54' may be extended at one end and provided with a sprocket gear 56' which may be connected by a sprocket chain with a sprocket gear 57 carried by the shaft 47' carrying the cutter blade 49. The free end of the extended portion of the shaft 54' may be provided with a suitable sprocket wheel 58 over which there may pass a sprocket chain 59, the other end of the said sprocket chain passing over a suitable sprocket wheel carried by the inner end of the engine crank shaft 28'.

Shafts 61 and 62 are connected together by gears 63. Also the shaft 61 is connected to a shaft 70 through a sprocket chain 66 and suitable sprocket wheels therefor. The shaft 70 drives shafts 33 through bevel gears 71. The shaft 62 carries on one end another sprocket wheel over which there passes a chain 65, said chain also passing over a suitable sprocket wheel carried by the shaft 53. The conveyor $c$ may be operated in any conventional manner from either shaft 61 or shaft 62.

At the rear of the cutter unit $C^1$ a suitable housing is provided to form a chamber $C^2$ into which the sections or pieces of cane stalks are deposited for cleaning. The compartment or chamber $C^2$ communicates through a passage 73 with the interior of the housing of the fan $F^1$. A pipe $73^a$ connects the interior of the cutter housing with interior of fan housing so that an air blast will assist in cleaning the cutter blade 49 and the housing therefor.

Within the compartment $C^2$ there is mounted a pair of shafts 74, each shaft carrying a pair of sprocket wheels 75. The sprocket wheels 75 have passing thereover an elevator belt $E^2$, said elevator belt consisting of a pair of sprocket chains 79 between which there is disposed a multiplicity of slats 80', said slats being preferably held in spaced relation by blocks, Figure 5. The cane stalk sections coming from the cutter unit $C^1$ will be delivered upon the conveyor belt $E^2$ and by moving this belt in the proper direction the cane stalk sections will be delivered upon the elevator belt $E^3$. The blast of air coming from the fan $F^1$ will be directed beneath the elevator belt $E^2$ and thereby blow the lighter particles from the sections of cane. These lighter particles will of course consist in the mutilated tops and leaves of the cane stalks and will be blown through an outlet casing 76'. The outlet casing 76' comprises a boxing of sheet metal which is so curved or shaped that the objects ejected therefrom will be cast upon the earth over which the machine may be traveling.

In order that the cut sections of cane stalks may be properly cleaned, I provide means for agitating the conveyor belt $E^2$ during the movement thereof, said means comprising an upper pair of bell crank levers 76 and a lower pair of similar bell crank levers 77. Suitable means are provided to which the bell crank levers 76 and 77 may be fulcrumed as at 78. A similar arm of each bell crank lever is positioned directly beneath the conveyor belt $E^2$, as shown, and a stop $79^a$ is provided for each bell crank lever to limit the downward swinging movement of its last named arm. The remaining arm of each of the bell crank levers 76 and 77 is connected to one end of a bar 80, as at 81. To similar ends of bars 80 there is pivotally connected the terminals of a U-shaped member 82 which has associated therewith a rod 83, said rod passing through an opening centrally of the bridge portion of said U-shaped member 82 and carrying a pair of coil springs 84, one upon each side of the member 82. A pair of nuts 85 may be threaded upon the rod 83 whereby the springs may be pressed toward each other. Also a nut as at 86 may be positioned upon each side of the bridge portion of the member 82. The forward end of the rod 83 carries a collar 87 and within this collar there is disposed an eccentric 88 which is carried by the shaft 89. The shaft 89 is driven through suitable gears 90 from the shaft 91, and said shaft 91 may be in turn driven through suitable bevel gears 92 from the shaft 61. The bell crank levers 76 and 77 will be rocked upon their fulcrum points 78 and thereby agitate the conveyor belt $E^2$.

Within the upper portion of the chamber $C^2$ there is pivoted a frame member 93 which supports a roller 94 and also carries at its forward end a shutter 95. The roller 94 is adapted to operate upon the elevator belt $E^2$ and with the shutter 95 rises or falls depending on the amount of cane passing, thereby permitting the passage of the cane stalks and preventing as far as possible the passage of the cleaning air blast.

The elevator belt $E^3$ may consist in a pair of sprocket chains 96 which are passed over the pair of sprocket wheels 97 positioned below the upper end of the conveyor belt $E^2$ and also over the sprocket wheels 98 which are elevated. The sprocket wheels 98 are supported by a shaft 99 carried by an auxiliary frame $F^3$. The frame $F^3$ also supports a chute $S^4$. Between the chains 96 there may be provided a multiplicity of slats 96' to complete the elevator belt. The elevator belt $E^3$ may be driven by a suitable sprocket chain 98' which is trained about a sprocket wheel carried by the shaft 99 and a suitable sprocket wheel carrying an extension of the shaft 62. A platform upon which a person may stand and overlook the conveyor belt $E^3$ is located upon the frame of the machine as at $P^5$. A person standing on this platform may take from the conveyor belt any objects or pieces of the cane stalks which he believes should not pass to the chute $S^4$, in other words, this person may assort the sections of cane stalks passing upon the belt $E^3$.

In the use of the present apparatus, the same may be guided so that a row of cane will pass between the sets of sprocket wheels $S^2$ and $S^3$ of the elevator unit $E^1$. The cane stalks are cut close to the ground and then elevated by the teeth 37' carried by the sprocket chains $S^2$ and $S^3$. The cane stalks are deposited upon the plate $P^2$ and gravitate upon conveyor C, and are delivered by said conveyor to the cutter $C^1$. Previous to delivery to the cutter $C^1$, the cane stalks pass beneath the presser unit $P^3$. The cutter $C^1$ severs the cane stalks into short sections, the length of the sections depending upon the rotational speed of the blade 49. The leaves and also the tops of the cane stalks are cut into short sections by the cutter $C^1$. These short sections of cane stalks, leaves, and tops pass upon the elevator belt $E^2$ where they are agitated and subjected to an air blast from the fan $F^1$. This air blast is of great importance for the reason that it separates sections of the cane stalks which may be utilized for the manufacture of sugar, from the tops and leaves of the cane. The stalk sections when delivered to the chute $S^4$ are sufficiently clean and ready to be delivered to the sugar plant. By cutting the stalks in short sections, the cane is more easily handled by conveyors and can be loaded in cars for delivery to the sugar factory.

Referring to Figure 7, 100 represents generally a rack upon which the mutilated or cut cane is deposited. The rack is supported by the arms 101 which are pivoted for forward and rearward swinging movement of the rack. A spring controlled rod is connected to the rack as at 103, and through the eccentric 104 and shaft 105 the rack 100 is oscillated for causing cut cane deposited therein to move upwardly and be subjected to the blast of air. Figure 7 shows an alternative construction that may be substituted for the conveyor $E^2$ and its connecting parts shown in Figures 3 and 9.

While I have shown and described the preferred form of my invention I wish it to be understood that I am aware of the fact that the construction, combination and arrangement of parts may be changed by those skilled in the art without departing from the spirit of the invention as indicated by the appended claims.

I claim:

1. In a sugar cane harvester, a rotary cutter, means for cutting cane and delivering the stalks to said cutter whereby said stalks including tops and blades will be severed into short sections, and means for submitting the sections of the stalks to an air blast whereby to separate the lighter objects from the heavier.

2. In a sugar cane harvester, a rotary cutter, means for cutting cane and delivering the stalks to said cutter whereby said stalks including tops and leaves will be severed into short sections, and combined agitator and air blast means whereby the cane stalk sections will be separated from the sections of leaves and tops.

3. In a sugar cane harvester, a rotary cutter, means for cutting cane and delivering the stalk to said cutter whereby said stalks including tops and leaves will be severed into short sections, combined agitator and air blast means whereby the cane stalk sections will be separated from the sections of leaves and tops, and means for delivering the sections of cane leaves and tops to the soil from which the cane is originally taken.

4. In a sugar cane harvester, a rotary cutter, means for cutting cane and delivering the stalks to said cutter whereby said stalks including tops and leaves will be severed into short sections, combined agitator and air blast means whereby the cane stalk sections will be separated from the sections of leaves and tops, means for delivering the sections of cane leaves and tops to the soil from which the cane is originally taken, and means for elevating the cane stalk sections to an elevated chute.

WILLIAM SNODGRASS.